(12) United States Patent
Mayer

(10) Patent No.: US 7,201,123 B2
(45) Date of Patent: Apr. 10, 2007

(54) METHOD AND DEVICE FOR OPERATING AN INTERNAL COMBUSTION ENGINE OF A VEHICLE

(75) Inventor: Rainer Mayer, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/849,309

(22) Filed: May 19, 2004

(65) Prior Publication Data
US 2004/0251060 A1 Dec. 16, 2004

(30) Foreign Application Priority Data
Jun. 3, 2003 (DE) ................. 103 24 958

(51) Int. Cl.
F01L 1/34 (2006.01)

(52) U.S. Cl. ................. 123/90.16; 123/90.15; 180/6.2; 701/41; 701/42

(58) Field of Classification Search ............. 123/90.15, 123/90.16, 90.17, 90.31; 180/6.2; 701/41, 701/42
See application file for complete search history.

(56) References Cited

U.S. PATENT DOCUMENTS

| | | | |
|---|---|---|---|
| 5,046,461 A * | 9/1991 | Kanehiro et al. | 123/90.15 |
| 5,765,527 A * | 6/1998 | Lehner et al. | 123/339.1 |
| 5,920,174 A * | 7/1999 | Kawada et al. | 318/663 |
| 5,947,084 A * | 9/1999 | Russell et al. | 123/339.16 |
| 6,039,023 A * | 3/2000 | Cullen et al. | 123/339.23 |

* cited by examiner

Primary Examiner—Thomas Denion
Assistant Examiner—Zelalem Eshete
(74) Attorney, Agent, or Firm—Kenyon & Kenyon LLP

(57) ABSTRACT

A method and a device for operating an engine of a vehicle, which allow a power demand of a steering device supported by the engine To be dynamically compensated for. In this context, a derivative-action signal for adjusting an output variable to be output by the engine is generated as a function of a steering action.

9 Claims, 2 Drawing Sheets

METHOD AND DEVICE FOR OPERATING AN INTERNAL COMBUSTION ENGINE OF A VEHICLE

FIELD OF THE INVENTION

The present invention relates to a method and a device for operating an internal combustion engine of a vehicle.

BACKGROUND INFORMATION

Steering devices in the form of power-steering systems may be supported by the internal combustion engine of the vehicle, in that the internal combustion engine provides torque for operating a servomotor.

In addition, models, which estimate each current torque requirement of mechanically driven, ancillary components such as an air conditioner or power-steering system, may be stored in the control system for internal combustion engines or gasoline engines. With the aid of the torque requirement of the ancillary components ascertained in this manner, the supply of additional fresh air in an air-controlled system or the supply of additional fuel in a fuel-amount-controlled system may be appropriately adjusted, in order to cover the torque requirement of the ancillary components, without reducing a vehicle drive (propulsive) torque that is generated as a function of a torque input by the driver via an accelerator. On the contrary, the propulsive torque of the vehicle can be held constant in response to an unchanged accelerator position.

In order that the required torque may be generated with the necessary dynamics in response to a rapid, positive load change, the appropriate amount of oxygen or fuel necessary for combustion must be available in the combustion chamber of the internal combustion engine. If the internal combustion engine of the engine is in an efficiency-optimized or exhaust-optimized operation, then it may not be possible to rapidly increase the oxygen or fuel concentration in the combustion chamber because of the inertia of the components used in the air system or fuel system. Therefore, a so-called derivative-action signal in the form of a torque reserve is generated early, which allows the air ratios or the fuel ratios in the combustion chamber to be adjusted in a foresighted manner.

SUMMARY OF THE INVENTION

With the exemplary method and/or exemplary device of the present invention, a derivative-action signal for adjusting an output variable to be output by the internal combustion engine is generated as a function of a steering operation (action). In this manner, the required reserve necessary for generating a constant propulsive torque at a constant accelerator position may even be generated in the case of a rapid, positive change in the assumed load (power consumption) due to the steering device. Therefore, the riding comfort is increased in this manner.

When the derivative-action signal is generated as a function of the steering-wheel angle acceleration (steering-angle acceleration). In this manner, the dynamics of a change in the load-circuit demand (power demand) of the steering device may be taken into account in a particularly simple and exact manner for generating the derivative-action signal.

In this context, as the steering-angle acceleration increases, an increasing reserve is generated by the derivative-action signal. In this manner, the dynamically increased power consumption of the steering device, which is caused by the increasing steering-angle acceleration, may be taken into account with the aid of a suitable reserve.

When the derivative-action signal is generated as a function of a steering angle, the dependence of the dynamic change in the power consumption of the steering device on the position of the steering device may be taken into account when generating the reserve, so that the reserve may be adapted even more accurately to the dynamic change in the power consumption of the steering device, and the ride comfort is further increased.

When the derivative-action signal is removed (reduced) at a predefined steering angle prior to reaching a full stop (the limit stop, the limit of travel). In this manner, it is taken into account that shortly before reaching the limit stop, the entire compensation for the steering device's power demand on the internal combustion engine is already carried out statically again, so that no dynamic compensation is necessary via the derivative-action signal.

When the derivative-action signal is reduced with decreasing steering angle, a reserve is also not necessary in this case, in which the power demand of the steering device is reduced.

DETAILED DESCRIPTION

Figure 1:
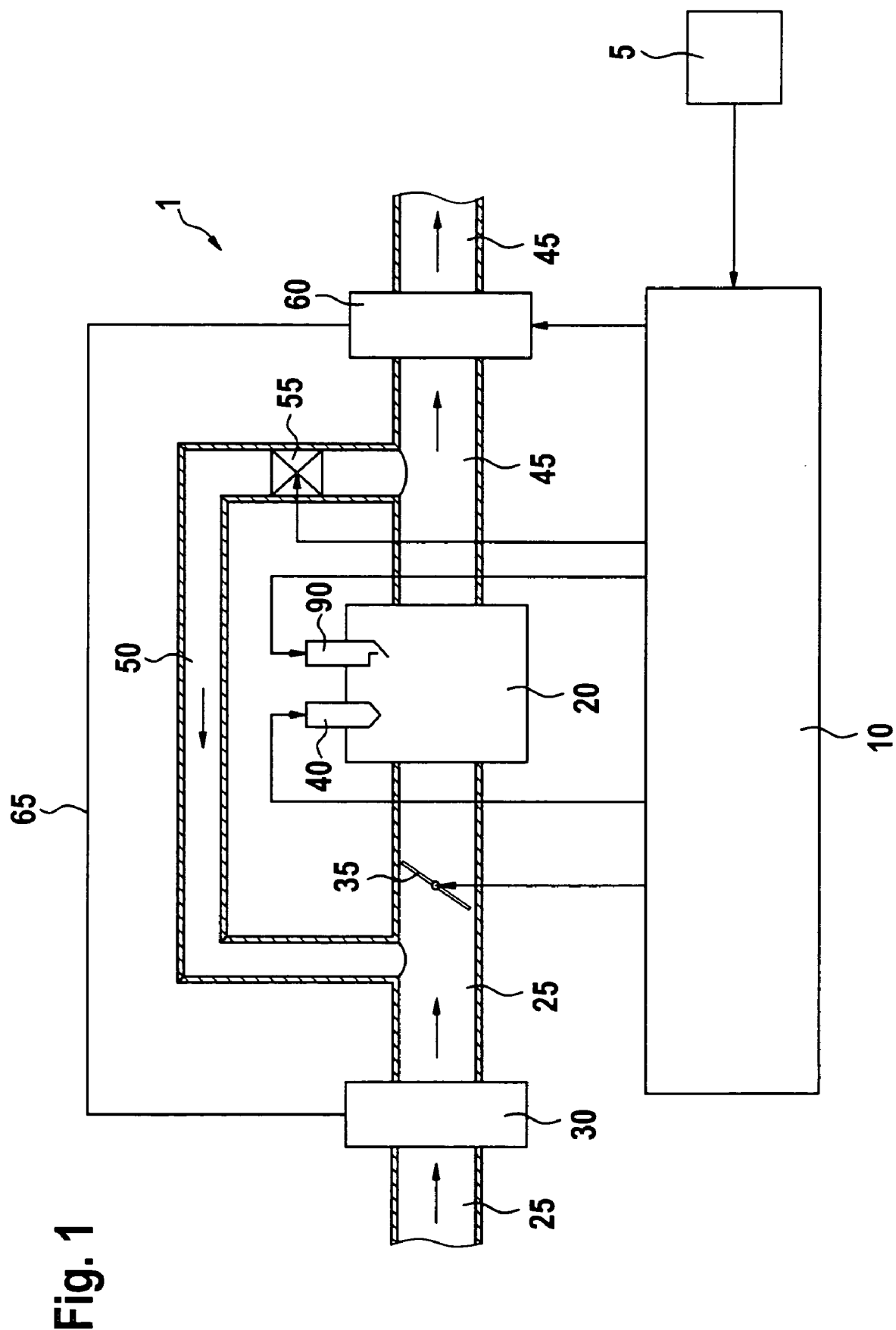
FIG. 1 shows a block diagram of an engine.

In FIG. 1, reference numeral 1 designates an engine of a vehicle. Engine 1 includes an internal combustion engine 20. Internal combustion engine 20 may take the form of, e.g. a spark-ignition engine or a diesel engine. In the following, it is assumed, for example, that internal combustion engine 20 takes the form of a spark-ignition engine. Internal combustion engine 20 is supplied with fresh air via an air inlet 25. The flow direction of the fresh air in air inlet 25 is indicated by arrows. In this context, a compressor 30 of, e.g. an exhaust-gas turbocharger, which compresses the supplied fresh air, may be situated in air inlet 25, as shown in FIG. 1. In air inlet 25, a throttle valve 35 for setting the amount of air supplied to a combustion chamber of internal combustion engine 20 not shown in FIG. 1 is positioned downstream from compressor 30 in the flow direction of the fresh air. To that end, the position of throttle valve 35 is controlled by a control unit 10. Fuel is injected into the combustion chamber of internal combustion engine 20 by injector 40, the mass of fuel to be injected and the start of injection also being stipulated by control unit 10.

According to FIG. 1, fuel is directly injected into the combustion chamber of internal combustion engine 20 by injector 40. As an alternative, injector 40 may also be situated in the so-called intake manifold (induction pipe) between throttle valve 35 and an intake valve of the combustion chamber not shown in FIG. 1. This is referred to as manifold injection. The air-fuel mixture in the combustion chamber of internal combustion engine 20 is ignited by a spark plug 90, whose ignition point is likewise selected by control unit 10. The exhaust gas produced during the combustion of the air-fuel mixture is discharged into an exhaust-system branch 45. The flow direction of the exhaust gas in exhaust-system branch 45 is also indicated by arrows. As shown in FIG. 1, an exhaust-gas recirculation duct 50 may be provided, which connects exhaust-system branch 45 with air inlet 25. The flow direction of the recirculated exhaust gas in exhaust-gas recirculation duct 50 is likewise designated by an arrow in FIG. 1.

According to FIG. 1, exhaust-gas recirculation duct 50 branches off from exhaust-system branch 45 between an exhaust valve of the combustion chamber not shown in FIG. 1 and a turbine 60 positioned downstream in the flow direction of the exhaust gas, and opens out into air inlet 25 between compressor 30 and throttle valve 35. Provided in exhaust-gas recirculation duct 50 is an exhaust-gas recirculation valve 55, whose degree of opening is also stipulated and set by control unit 10. In the case in which the exhaust-gas turbocharger is present, turbine 60 is situated in exhaust-system branch 45 according to FIG. 1, the turbine being driven by the mass flux of exhaust gas and being connected to compressor 30 by a shaft 65, in order to drive compressor 30. Control unit 10 controls the compressing capacity of compressor 30, e.g. by adjusting the turbine geometry of turbine 60, and/or via a bypass valve of a bypass around turbine 60, the bypass valve not being shown in FIG. 1, and the bypass also not being shown.

Also provided in FIG. 1 is a steering device 5 of the vehicle, e.g. in the form of a power-steering system, which measures the steering angle with the aid of a steering angle sensor not shown in FIG. 1 and transmits it to control unit 10. In this context, the power-steering system may be, for example, a hydraulic power steering system having a power-steering pump.

The exemplary embodiment and/or exemplary method of the present invention provides for a derivative-action signal for adjusting an output variable to be output by engine 1 to be generated as a function of a steering action of steering device 5. This output variable may be, e.g. a torque, a power output, a cylinder charge, or a variable derived from one of the mentioned variables. In the following, it shall be assumed, for example, that the output variable is a torque.

The derivative-action signal accordingly takes the form of a torque reserve. Steering device 5 demands a torque from engine 1 via control unit 10, the torque being necessary in order to implement a steering movement carried out by the driver on, e.g. a steering wheel of steering device 5, via the power-steering system, at the front wheels of the vehicle.

In the event of a rapid, positive change in the torque demand or power demand of steering device 5 on engine 1, the appropriate amount of oxygen or fuel necessary for the combustion in the combustion chamber of internal combustion engine 20 must be made available, in order that the corresponding torque may be generated with the necessary dynamics, without a sudden, unwanted drop in the propulsive torque of the vehicle and, therefore, an adverse effect on the riding comfort. If internal combustion engine 20 is in efficiency-optimized or exhaust-optimized operation, then it is not possible to rapidly increase the oxygen concentration or the fuel concentration because of the inertia of the components used in the air system, such as throttle valve 35, turbine 60 of the exhaust-gas turbocharger, exhaust-gas recirculation valve 55, and the components of injector 40 used in the fuel system. Therefore, the derivative-action signal or, in this example, the torque reserve is generated early, in order to allow the air ratios or the fuel ratios to be adapted in a foresighted manner.

In this context, the exemplary embodiment and/or exemplary method of the present invention provides for the steering dynamics of the driver to be monitored and a reserve to be formed as a function of the steering dynamics, a boosted reserve being built up when the power-steering pump approaches the operating ranges of its maximum power consumption.

Figure 2:
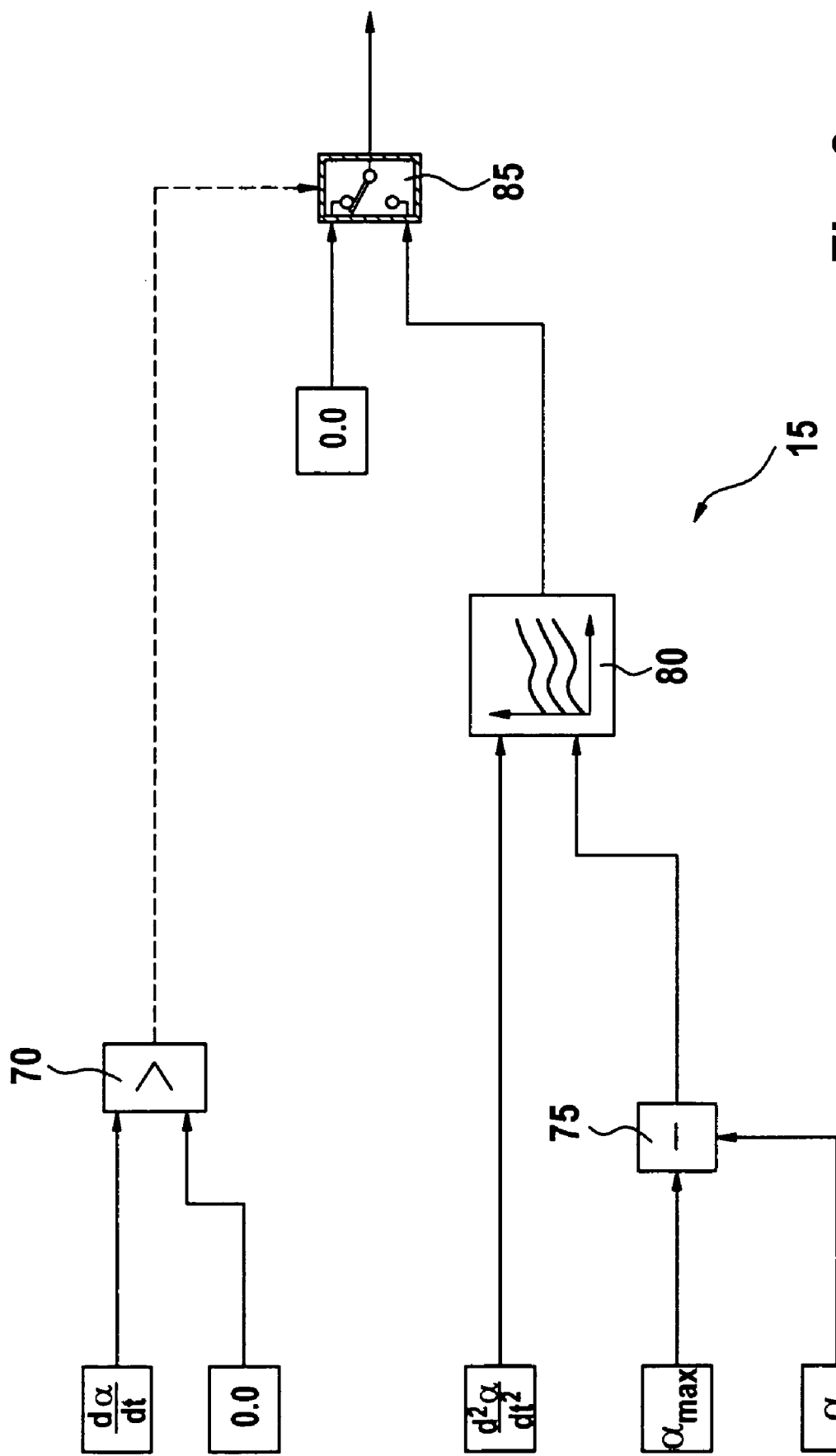
FIG. 2 shows a flow chart for representing both an exemplary device of the present invention and an exemplary functional sequence of the method according to the present invention.

The exemplary method of the present invention and the exemplary device of the present invention are explained in detail with the aid of the flowchart according to FIG. 2. A prerequisite for this is that the time characteristic of steering angle α of the steering wheel on the basis of the steering movement of the driver is supplied. In addition, maximum possible steering angle α max of steering device 5 is known in control unit 10. In control unit 10, first derivative $$\frac{d\alpha}{dt}$$

of the magnitude of steering angle α with respect to time and second derivative $$\frac{d^2\alpha}{dt^2}$$

of the magnitude of steering angle α with respect to time are calculated from the time characteristic of steering angle α. Current steering angle α is subtracted from maximum possible steering angle α max in a subtraction element 75.

The difference calculated in this manner is supplied to a characteristics map 80 as one of two input variables, the other input variable of the characteristics map being formed by second derivative $$\frac{d^2\alpha}{dt^2}$$

of steering angle α with respect to time. Characteristics map 80 may be applied, for example, on a test stand and/or during driving trials and outputs the required torque reserve or, in general, the required reserve, as a function of second derivative $$\frac{d^2\alpha}{dt^2}$$

of steering angle α with respect to time and the distance of steering angle α from maximum possible steering angle α max, in order to produce the rapid, positive load change necessary for implementing desired steering angle α without an unwanted, sudden drop in the propulsive torque of the vehicle.

In this context, characteristics map 80 is populated with data in such a manner, that, for increasing steering-angle accelerations, i.e. for increasing second derivatives $$\frac{d^2\alpha}{dt^2}$$

of steering angle α, an increasing reserve is formed by the derivative-action signal. In each instance, this reserve increases in response to current steering angle α approaching maximum possible steering angle α max, i.e. the limit stop of the steering wheel. In this manner, a boosted reserve may be generated when the power-steering pump approaches the operating range of the maximum power consumption. Shortly before reaching the limit stop, i.e. shortly before the difference at the output of subtraction element 75 reaches a value of zero, the reserve is reduced again by the derivative-action signal.

To this end, the output signal of characteristics map 80 may approach zero, when a predefined steering angle is reached relatively shortly before the limit stop is reached by the driver's steering movement in the direction of the limit stop. When, e.g. the travel limit is at a steering angle of 450 degrees, then the predefined steering angle may be ten degrees before the travel limit. In this context, the predefined steering angle is selected so that the power demand of steering device 5 is, in essence, statically compensated for when the predefined steering angle is reached, i.e. a rapid positive change in the power demand of steering device 5 is then no longer present, so no more reserve is necessary.

In the case of decreasing steering angle α, i.e. when the driver moves the steering wheel in the direction of its middle position again, and therefore in the direction of lower load, a reserve is also not required, and any derivative-action signal for steering device 5 is reduced. This is implemented according to the flowchart in FIG. 2, in that first derivative $$\frac{d\alpha}{dt}$$

of steering angle α with respect to time and the value zero are supplied to a comparing element 70. The output of comparing element 70 triggers a controlled switch 85.

Controlled switch 85 may be switched over between the value zero and the output of characteristics map 80. When first derivative $$\frac{d\alpha}{dt}$$

of the magnitude of steering angle α with respect to time is greater than zero, then controlled switch 85 is controlled by the output of comparing element 70 in such a manner, that it selects the output of characteristics map 80 as a reserve. In this case, the driver moves the steering wheel in the direction of the limit stop. Otherwise, i.e. when the driver does not move the steering wheel or moves it in the direction of its middle position and, therefore, first derivative $$\frac{d\alpha}{dt}$$

of steering-wheel angle α with respect to time is equal to zero or less than zero, comparing element 70 activates controlled switch 85 in such a manner, that it selects the value zero as a reserve, so that no reserve is selected.

The flow chart represented in FIG. 2 constitutes the arrangement 15 for producing a reserve for a dynamic power demand of steering device 5 and may be implemented in control unit 10 in the form of software and/or hardware.

Control unit adjusts the amount of air supplied to the combustion chamber of internal combustion engine 20 as a function of the derivative-action signal, in particular in the case of a spark-ignition engine. Therefore, if a reserve for steering device 5, which is in the form of, e.g. a torque reserve and not equal to zero, is provided at the output of controlled switch 85, then the torque reserve is implemented by increasing the air supply to the combustion chamber. This increase may be implemented by increasing the power output of compressor 30 to increase the fresh air supply, by reducing the opening cross-section of exhaust-gas recirculation valve 55 to attain a higher concentration of fresh air in the combustion chamber, and/or by appropriately adjusting throttle valve 35, i.e. increasing the opening cross-section of throttle valve 35 to increase the fresh air supply on the side of control unit 10.

In addition, or alternatively, the implementation of the reserve as a function of the derivative-action signal at the output of controlled switch 85 may also be realized by adjusting the amount of fuel supplied to the combustion chamber. Therefore, if a reserve for steering device 5, which is in the form of, e.g. a torque reserve and not equal to zero, is provided at the output of controlled switch 85, then the torque reserve may be implemented by increasing the fuel supply to the combustion chamber. This may be carried out by control unit 10 in an available manner, in that the amount of fuel to be injected and the start of injection to be selected are appropriately controlled. If the reserve or, in this case, the torque reserve is to be implemented in a manner neutral with respect to torque, this may be achieved in an available manner, in that control unit 10 retards the ignition angle while simultaneously increasing the air supply or the fuel supply.

The reserve or, in this example, the torque reserve is then released in that control unit 10 then re-advances the ignition angle, in order to implement the dynamic power demand of steering device 5 in a manner that it is likewise neutral with respect to torque or the propulsive torque.

What is claimed is:

1. A method for operating an engine of a vehicle having a steering device supported by the engine, the method comprising:

generating a derivative-action signal for adjusting an output variable to be output by the engine as a function of a steering operation in such a way as to produce a constant propulsion torque at a constant accelerator pedal position, wherein the derivative-action signal is generated as a function of a steering-wheel angle acceleration.

2. The method of claim 1, further comprising: selecting a torque as an output variable of the engine, and selecting a torque reserve as a derivative-action signal.

3. The method of claim 1, wherein an increasing reserve is formed by the derivative-action signal, as the steering angle acceleration increases.

4. The method of claim 1, wherein the derivative-action signal is generated as a function of a steering angle.

5. The method of claim 1, wherein the derivative-action signal is reduced at a predefined steering angle prior to reaching a full stop.

6. The method of claim 1, wherein the derivative-action signal is reduced with a decreasing steering angle.

7. The method of claim 1, wherein an amount of air supplied to a combustion chamber of the engine is adjusted as a function of the derivative-action signal.

8. The method of claim 1, wherein an amount of fuel supplied to a combustion chamber of the engine is adjusted as a function of the derivative-action signal.

9. A device for operating an engine of a vehicle having a steering device supported by the engine, comprising:
   a generating arrangement to generate, in such a way as to produce a constant propulsion torque at a constant accelerator pedal position, a derivative-action signal as a function of a steering action to adjust an output variable to be output by the engine, wherein the derivative-action signal is generated as a function of a steering-wheel angle acceleration.

* * * * *